United States Patent [19]

Brock et al.

[11] Patent Number: 4,737,876
[45] Date of Patent: Apr. 12, 1988

[54] WRITE PROTECT DEVICE FOR A RECORD DISK ASSEMBLY

[75] Inventors: George W. Brock, Los Altos Hills; Edward Mroz, Menlo Park; Robert J. Janning, Jr., Cupertino; Robert S. Rogers, San Jose, all of Calif.

[73] Assignee: Verbatim Corporation, Sunnyvale, Calif.

[21] Appl. No.: 885,885

[22] Filed: Sep. 30, 1986

Related U.S. Application Data

[62] Division of Ser. No. 495,980, May 19, 1983, Pat. No. 4,626,949.

[51] Int. Cl.$^4$ ............................................. G11B 23/02
[52] U.S. Cl. ...................................... 360/133; 360/60
[58] Field of Search .................... 360/60, 66, 133, 132

[56] References Cited

U.S. PATENT DOCUMENTS

| | | | |
|---|---|---|---|
| 4,053,935 | 10/1977 | Shiba | 360/60 |
| 4,320,422 | 3/1982 | Rinkleib | 360/60 |
| 4,546,397 | 10/1985 | Asami et al. | 360/133 |
| 4,549,240 | 10/1985 | Hodges | 360/133 |

FOREIGN PATENT DOCUMENTS

| | | | |
|---|---|---|---|
| 2604172 | 2/1976 | Fed. Rep. of Germany | 360/60 |
| 2090226 | 7/1982 | United Kingdom | 360/60 |

Primary Examiner—Stuart N. Hecker
Assistant Examiner—David J. Severin
Attorney, Agent, or Firm—William C. Dixon

[57] ABSTRACT

A magnetic record disk assembly includes a floppy disk located within a rigid case having integral case stiffeners, wiping force appliers and floppy disk stabilizers. Wipers made of fabric, cleaning material are located within the case and disk flexure creates frictional force between the wipers and the disk. Thus, the wipers clean contaminants from the disk during rotation thereof within the case. A simple, automatic, cam-actuated shutter covers a transducer access slot in the case. This shutter is restrained by a detent to prevent undesired movement. A modified form of shutter has a compression spring that facilitates assembly of the shutter. A write protect device is located within the case. This device includes a piece that is mounted to rotate through an arc of 180° in a plane perpendicular to a side surface of the case for opening and closing a sensing aperture within the case.

7 Claims, 3 Drawing Sheets

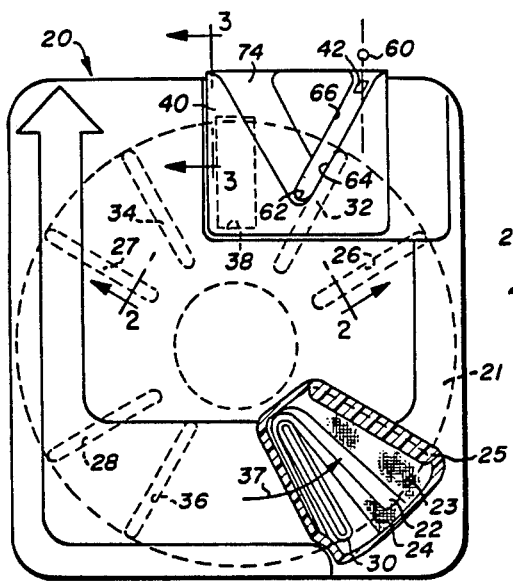
Fig_1
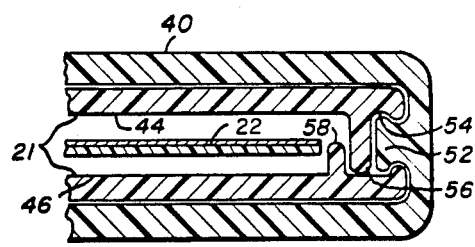
Fig_3
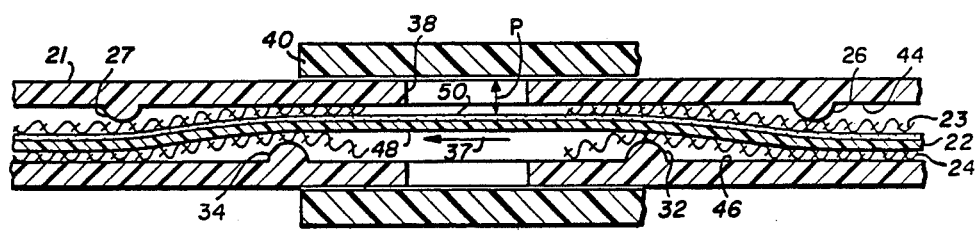
Fig_2
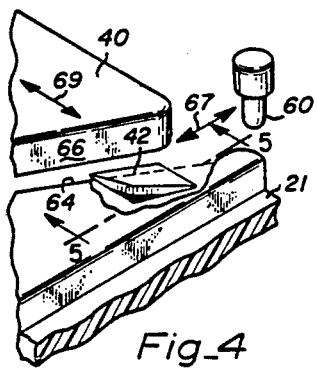
Fig_4
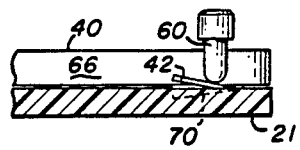
Fig_5

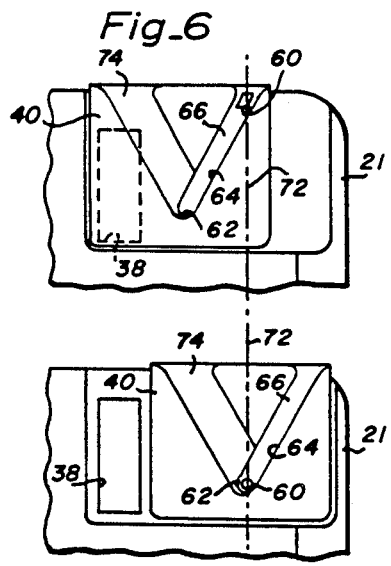
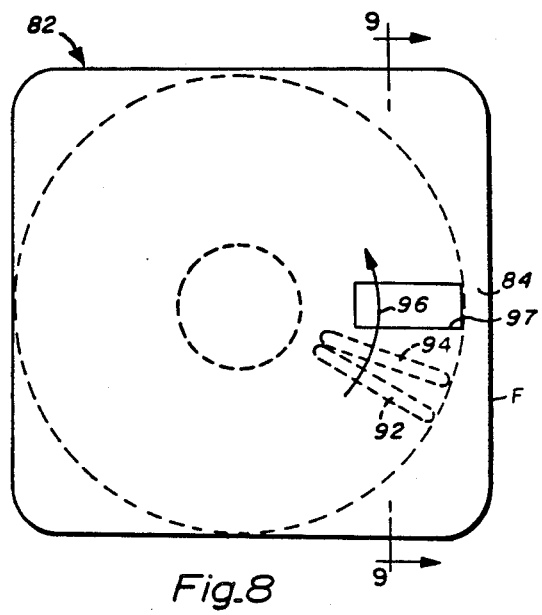
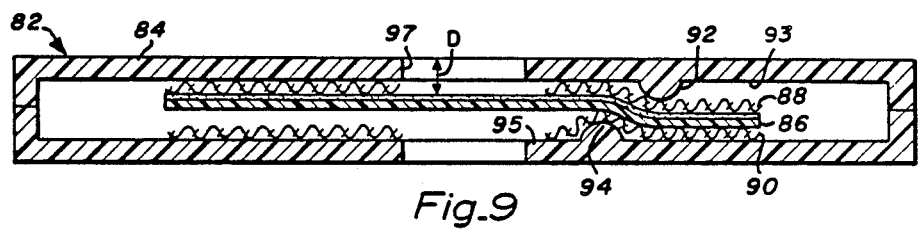
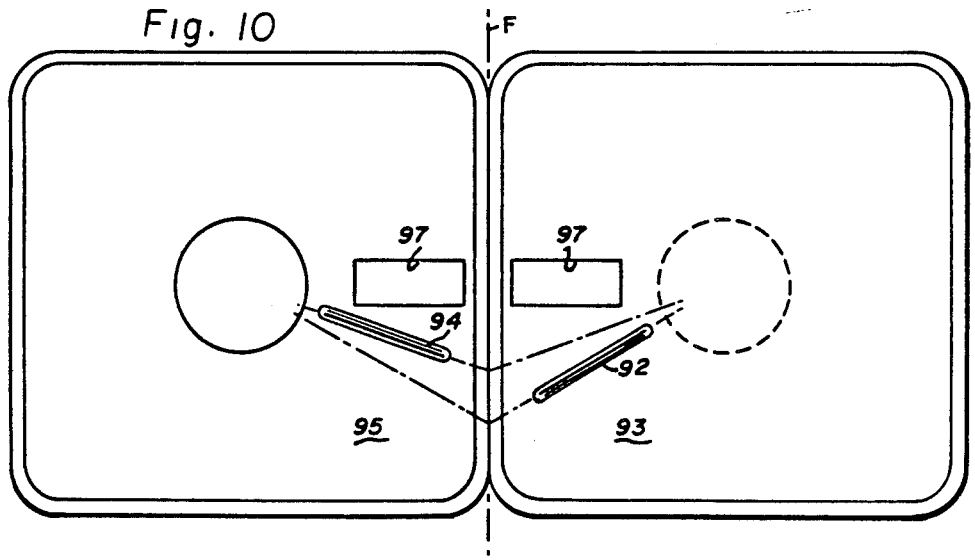

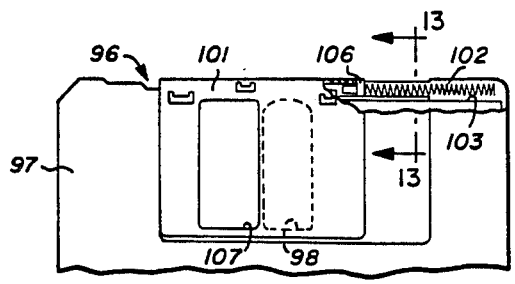
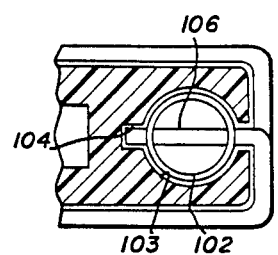
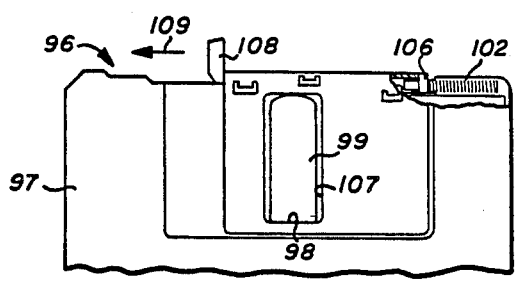
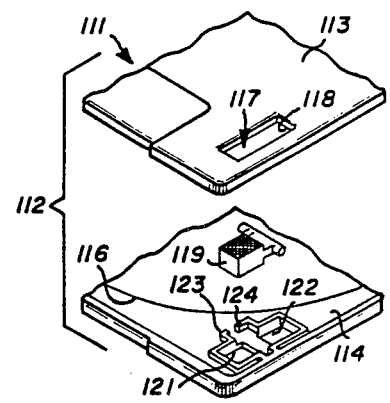
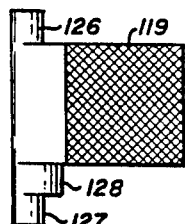
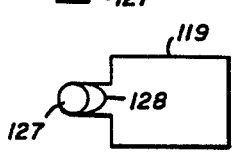
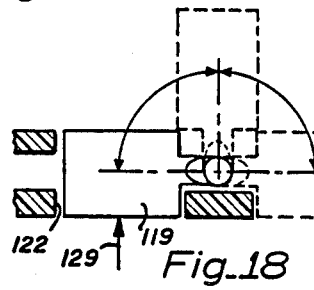
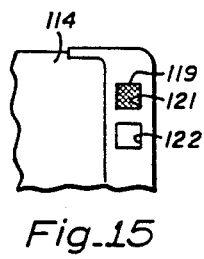
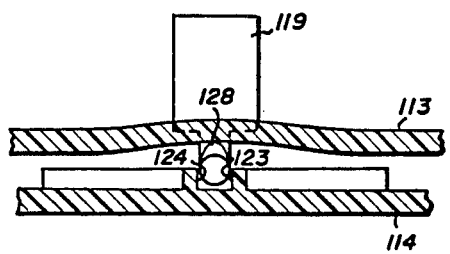

WRITE PROTECT DEVICE FOR A RECORD DISK ASSEMBLY

This is a division of application Ser. No. 495,980, filed May 19, 1983, now U.S. Pat. No. 4,626,949.

BACKGROUND OF THE INVENTION

1. Field of the Invention

This invention relates to a magnetic record disk assembly. More specifically, it concerns a floppy disk located within a rigid case having integral case stiffeners, wiping force appliers, floppy disk stabilizers, a cam-operated shutter for covering a transducer access slot, a shutter assembly with a compression spring, and a write protect device.

2. Description of the Prior Art

Floppy disks have been housed in flexible casings, as illustrated in U.S. Pat. No. 3,668,658 that issued June 6, 1972, to Flores, et al. A sponge clamp on a mechanical drive squeezes the casing in the vicinity of a transducer access aperture. This presses a liner within the casing into wiping engagement against a record surface of the disk for cleaning the same. The clamp also stabilizes the disk in a uniform plane just before passing the transducer access aperture so the required transducer penetration will be a constant distance. Rigid housings make such clamps ineffective for providing wiping pressure and stabilizing the disk.

Sony Corporation has attempted to solve the problem of wiper pressure within a rigid casing by using a polyester film (PET, Mylar) leaf spring to press a liner against a flexible disk at one location.

Disk housings have had manually slidable U-shaped clips that form a shutter for sealing the head slot opening. Also, complex shutter-spring mechanisms, have been used as shown in U.S. Pat. No. 3,529,301 that issued Sept. 15, 1970, to Hiruta.

Misreading of information or dropout is a serious problem encountered when transmitting information from a disk into a computer. Dropout is a reduction in output signal level during reproduction of recorded data, sufficient to cause a processing error. Dropout can be prevented and the disk can be maintained in a readily readable condition by (1) keeping dust and other contaminants from settling on the magnetic record surface, (2) cleaning any contaminant that may be present from the magnetic surface, (3) maintaining the record surface of the disk in a uniform plane for a constant head penetration distance, and (4) protecting the magnetic record surface from being subjected to contamination during handling operations.

To maintain a floppy disk in a readily readable condition within a rigid case, sufficient frictional force should be provided between the floppy disk and a wiper for cleaning the disk. The disk should be stabilized in a uniform plane for constant transducer penetration. Shutter means should be provided for sealing the transducer access slot when the magnetic disk assembly is not in use. Simple, automatic means should be provided for opening the shutter means when the case is inserted into a disk drive and for closing the shutter means when the case is removed from the disk drive. A detent should be provided for locking the shutter means in a closed position when the case is removed from the disk drive. A magnetic record disk assembly producing these desired results is the subject matter of this invention.

Known magnetic record disk assemblies include write protect devices that require excessive force to operate and invite the use of fingernails. Such devices are difficult to operate and tend to break the operator's fingernails. Known magnetic disk assemblies have shutter spring assemblies that are difficult to assemble because they include an extension spring that must be anchored at one end to the shutter and at the other end to the case.

SUMMARY OF THE INVENTION

An object of the present invention is to maintain a magnetic record disk, made of flexible material, in a readily readable condition within a rigid case.

Another object of the invention is to maintain a floppy disk in a clean condition sealed within a rigid case.

Another object of the invention is to provide, within a rigid case, sufficient frictional force between a magnetic record surface of a floppy disk and an adjacent wiper made of cleaning material for wiping the record surface clean.

Another object of the invention is to stabilize a floppy disk in a uniform plane to enable constant transducer penetration distance.

Another object of the invention is to provide a write protect device that requires the deliberate use of an implement, such as a pen or pencil point, for applying a small force to operate.

A further object of the invention is to provide a shutter assembly with a compression spring that facilitates assembly.

In accordance with the present invention, there is provided a magnetic record disk assembly. This assembly includes a magnetic record disk that is made of flexible material and that has magnetic record surfaces. The disk is contained within a rigid case having inner surfaces. Wipers made of cleaning material are located between the inner surfaces of the case and the adjacent record surfaces of the disk. The disk is rotatable while the case is maintained stationary. Disk flexing means are provided for creating frictional force between a record surface of the disk and a wiper. Thus, the wiper cleans contaminents from the disk during rotation thereof.

In a preferred embodiment of the invention, a magnetic record disk assembly has a disk with a record surface on at least one side. A case that contains the disk has sides parallel to the sides of the disk. A write protect device is located within the case and includes a piece that is mounted to rotate through an arc of 180° in a plane perpendicular to a side surface of the case for opening or closing a sensing aperture within the case.

Advantages of the present invention include providing sufficient frictional force between a floppy disk and a wiper for cleaning the disk, providing disk stabilization in a uniform plane for enabling constant transducer penetration distance, maintaining the disk in a clean, readily readable condition sealed within a rigid case, a write protect device that requires the deliberate use of an implement, such as a pen or pencil point, for applying a small force to operate, and a shutter assembly with a compression spring that facilitates assembly.

These and other objects and advantages of the present invention will no doubt become obvious to those of ordinary skill in the art after having read the following detailed description of the preferred embodiments which are illustrated in the various drawing figures.

IN THE DRAWING

FIG. 1 is a plan view with portions broken away to show underlying structure of a magnetic record disk assembly embodying the present invention;

FIG. 2 is an enlarged section in elevation taken on the arcuate line 2—2 of FIG. 1;

FIG. 3 is an enlarged section in elevation taken on the line 3—3 of FIG. 1;

FIG. 4 is a broken perspective view of a cam actuated shutter means and a detent therefor;

FIG. 5 is a section in elevation taken on the line 5—5 of FIG. 4;

FIGS. 6 and 7 are operational views illustrating opening and closing of the shutter means;

FIG. 8 is a plan view of a magnetic record disk assembly illustrating a modified form of the invention;

FIG. 9 is a section in elevation taken on the line 9—9 of FIG. 8;

FIG. 10 is an interior plan view of the magnetic record disk assembly case, shown in FIG. 8, opened about a fold line F;

FIG. 11 is a broken plan view of a magnetic record disk assembly having a shutter assembly that is retained in a closed position by a compression spring;

FIG. 12 is an operational view of the shutter assembly, shown in FIG. 11 with the shutter in an open position;

FIG. 13 is a vertical section taken on the line 13—13 of FIG. 11;

FIG. 14 is an exploded perspective view of a write protect device that fits within the magnetic record disk assembly;

FIG. 15 is a bottom plan view of the write protect device shown in FIG. 14;

FIG. 16 is a plan view of a rotatable piece within the write protect device;

FIG. 17 is a side elevation view of the rotatable piece taken on the side to show an eccentric cam;

FIG. 18 is an operational view illustrating movement of the rotatable piece; and FIG. 19 is an operational view illustrating the movement of the eccentric cam and the adjacent side of the case.

DETAILED DESCRIPTION OF THE PREFERRED EMBODIMENTS

Looking now at FIG. 1, a magnetic record disk assembly, indicated by general reference number 20, has a rigid case 21 that contains a magnetic record disk 22 made of flexible material. A wiper 23 is located on one side of the disk, and a wiper 24 is located on the opposite side of the disk. These wipers are made of a fabric, cleaning material. A multiple of projections 25, 26, 27 and 28 project from the case downward towards the disk, and a multiple of projections 30, 32, 34 and 36 project from the case upward towards the disk. These projections are integral with the case and stiffen the case. They cause the disk to flex and thereby create frictional force between the disk and a wiper. Upon rotation of the disk, in the direction of arrow 37, the wipers clean contaminents from the disk. A transducer access slot 38 is provided within the case, and this slot is closed by a cam-actuated shutter 40 that is restrained by a detent 42.

With reference to FIG. 2, the rigid case 21 has an upper inner surface 44 and a lower inner surface 46 that are opposed to each other. Projecting from opposite inner surfaces of the case towards the disk 22 are the first pair of projections 26 and 32 at a location upstream from the transducer access slot 38 and the second pair of projections 27 and 34 at a location downstream from the slot. These projections extend transversely of the direction of rotation of the disk, as indicated by the arrow 37. Each pair of upper and lower projections define therebetween an oblique course of disk travel with the disk 22 bending about the projections. The disk 22 slopes from a lower plane opposite projection 26 to an upper plane opposite projection 32 and from the upper plane opposite projection 34 to the lower plane opposite projection 27. The disk 22 is made of a flexible material 48 with a magnetic oxide coating 50 bonded to one or more of the flat, record surfaces. When the disk 22 is in flexure between the projections, the resulting reactions at the projections create frictional force between a record surface of the disk 22 and a wiper 23 or 24. The disk 22 is supported as a continuous beam between the projections and is stabilized in a uniform plane relative to the transducer access slot to provide a constant transducer penetration distance P. Negative bending moment between the projections 32 and 34 counteracts positive bending moment due to the weight of the disk 16 and the transducer contact force.

As shown in FIG. 3, the shutter 40 has an internal sliding guide 52 in the shape of a dove-tail that fits within a dove-tail groove 54 at one end of the rigid case 21. A flange 56 projects downward from the upper inner surface 44 and a flange 58 projects upward from the lower inner surface 46 to restrict the passage of dirt from the dove-tail groove to the disk 22 within the case. This dove-tail sliding guide makes removal of the shutter from the case impossible without destruction of the case and/or the shutter.

Looking again at FIG. 1, the shutter 40 is slidably mounted on the case 21 for opening and closing the transducer access slot 38. A disk drive, not shown, has a spring-loaded pin 60 for actuating the shutter as the magnetic record disk assembly 20 is inserted into or removed from the disk drive. The shutter has a cam slot 62 defined between opposing sidewalls 64 and 66. The detent 42 is a flap that is partially cut from the case and resiliently projects upward to restrain movement of the shutter. This detent is shown more clearly in FIGS. 4 and 5. The disk assembly is inserted or removed from the disk drive in the direction of the double arrow 67, shown in FIG. 4, and the shutter moves perpendicular thereto in the direction of double arrow 69. Upon insertion of the disk into the drive, the spring-loaded pin forces the detent downward into a recess 70 (FIG. 5) in the case. This allows the shutter to slide sideways. The detent can also be pushed down with an object such as a pencil tip or ball point.

With reference to FIG. 6, after the pin 60 pushes the detent 42 into the recess 70, the pin contacts the sidewall 64. This forces the shutter 40 to move to the right, as the pin travels along the line 72 until it reaches the bottom of slot 62, as shown in FIG. 7. In this position, the transducer access slot 38 is open. The shutter is closed by removing the case 21 from the drive. This causes the pin to contact the sidewall 66, forcing the shutter to the left and closing the transducer access slot, as shown in FIG. 6. After the pin passes over the detent, the detent resiliently projects upward to restrict movement of the shutter.

Looking again at FIGS. 1, 6 and 7, the cam slot 62 has an inclination relative to the shutter 40 that is similar to one branch of the letter V. Another branch 74 of this letter has been painted on the shutter to form with the cam slot a V-shaped logo. It will be understood that if it was desirable for the shutter to move to the left for opening, instead of to the right, the branch 74 would be the cam slot and the branch that is the cam 62 would be painted on the shutter.

A second embodiment of the invention is illustrated in FIGS. 8–10. A magnetic record disk assembly, indicated by general reference numeral 82, has a rigid case 84 that contains a magnetic record disk 86, as shown in FIG. 9, made of flexible material. A wiper 88 is located on one side of the disk and a wiper 90 is located on the opposite side of the disk. These wipers are made of fabric, cleaning material such as rayon. The case has a downward projection 92 from an upper inner surface 93 and an upward projection 94 from a lower inner surface 95. These projections extend transversely of the direction of rotation of the disk, as indicated by arrow 96 (FIG. 8). The projections are spaced slightly from each other in the direction of disk rotation and define therebetween a sharply oblique course of disk travel with a disk bending about the projections. A transducer access slot 97 is located slightly downstream in the direction of disk rotation from the projections. The slot exposes a portion of the disk record surface that is stabilized in a uniform plane by disk tension resulting from torque on the disk downstream from the slot pulling the disk through the wipers 88 and 90 and the projections 92 and 94. A constant transducer penetration distance D is provided due to stabilization of the disk in a uniform plane. The disk is cleaned by the wipers 88 and 90 as previously described for the embodiment shown in FIGS. 1–7.

FIG. 10 shows the interior of case 84 when folded about line F into an open position and the relationship between the projections 92 and 94.

With reference to FIGS. 11–13, a third embodiment of the invention is illustrated. A magnetic record disk assembly, indicated by general reference numeral 96, has a case 97 with a transducer access slot 98 therein exposing a portion of the record surface of a magnetic record disk 99. A shutter 101 is slidably mounted on the case for closing the transducer access slot when the magnetic record disk assembly is not in use. A compression spring 102 is positioned between the shutter and the case in the direction of travel that the shutter moves for opening the transducer access slot. A cylindrical bore 103 is provided within the case for receiving the compression spring. A groove 104 intersects the cylindrical bore and a flange 106 that projects from the shutter fits within the groove. The shutter flange contacts one end of the compression spring, while the opposite end of the spring bears against the case at the internal end of the bore. This compression spring can be readily slipped into the cylindrical bore and contact the shutter for simple assembly, while an extension spring requires anchorage of the spring ends to the shutter and the case making assembly more difficult. The shutter has an opening 107 that registers with the transducer access slot 98 when the assembly 96 is inserted into a disk drive, not shown. A pawl 108, within the disk drive, retains the shutter as the case 97 moves in the direction of arrow 109, compressing the compression spring 102. When the magnetic record disk assembly is withdrawn from the disk drive, the compression spring returns the shutter to the position shown in FIG. 11, closing the transducer access slot.

A fourth embodiment of the invention is illustrated in FIGS. 14–19. A magnetic record disk assembly, indicated by general reference numeral 111, has a case 112 formed by a top panel 113 and a bottom panel 114. A magnetic record disk 116 is positioned between the top and bottom panels. Offset radially from the disk is a write protect device, indicated by general reference numeral 117, that is located within the case. An elongated aperture 118 is provided in the top panel. A rotatable piece 119 fits between the top and bottom panels. A sensing opening or aperture 121 and adjacent thereto a similar opening or aperture 122 is provided in the bottom panel to define a panel strip therebetween. Projecting from the bottom panel are opposed supports 123 and 124 that restrain rotation of the piece within a plane parallel to the case panels. Looking now at FIG. 16, the piece has cylindrical arms 126 and 127 that fit between the opposed supports on the panel strip. An eccentric cam 128 is provided between the cylindrical arm 127 and the piece body or head for contacting the top panel when the piece is rotated. Such contact causes deflection of the top panel that results in resilient force urging the piece towards positions either opening or closing the sensing aperture.

In operation an implement such as a pen or pencil point can be used to apply a small force in the direction indicated by an arrow 129 in FIG. 18. This causes the piece 119 to rotate upward through an arc of 90° to the upright position shown in phantom line. A slight lateral force will cause the piece to snap over center. Then, the resilient force in the top panel 113 bearing against the eccentric cam 128, as shown in FIG. 19, will cause the piece to rotate downward through an arc of 90° to the phantom line position, shown in FIG. 18, in the sensing aperture 121. The piece can be returned to the position in aperture 122 by reversing the above procedure. A sensing probe in the disk drive, not shown, senses whether or not the sensing aperture is open or closed and this determines whether or not the disk can be written upon. Thus, the disk is protected against unintentional recording thereon.

From the foregoing description, it will be seen that the magnetic record disk assemblies 20 and 82 provide sufficient frictional force between a floppy disk 22, 86 and a wiper 23, 24, 88, 90 for cleaning the disk. Stabilization of the disk in a uniform plane enables a constant transducer penetration distance P, D. The disks 22, 86 are maintained in a clean, readily readable condition sealed within rigid cases 21, 84. A write protect device 117 requires the deliberate use of an implement, such as a pen or pencil point, for applying a small force to operate. A shutter assembly has a compression spring 102 that facilitates assembly.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A write protect device for a record disk assembly comprising:
   top and bottom panels spaced apart to define a compartment within which the record disk is moveable;

an elongated aperture in one of the top and bottom panels;

a pair of spaced openings in the other of the top and bottom panels in register with the elongated aperture, one of the spaced openings being a write protect sensing opening; and a write protect piece mounted in the compartment and having one end thereof forming a pivot about which the write protect piece is adapted to be pivoted outside of the elongated aperture between a first position, in which the write protect piece blocks the sensing opening and portion of the aperture in register therewith, and a second position 180° from the first position for unblocking the sensing opening and the portion of the aperture in register therewith.

2. A write protect device for a record disk assembly comprising:

top and bottom panels spaced apart to define a compartment within which the record disk is moveable;

an elongated aperture in one of the top and bottom panels;

a pair of spaced openings defining a panel strip therebetween in the other of the top and bottom panels, one of which is a write protect sensing opening, both spaced openings are, provided in register with a portion of the elongated aperture;

a write protect piece mounted in the compartment and pivotal through an angle of 180° about one end thereof located in register with the panel strip; and mounting means on the inner surface of the other of the top and bottom panels for mounting the one end of the pivotal write protect piece in the compartment so that it is adapted to be pivoted outside of the elongated opening between a first position, in which the write protect piece closes the sensing opening and portion of the aperture, and a second position 180° from the first position in which the write protect piece opens the sensing opening and portion of the aperture.

3. A write protect device according to claim 2 wherein the one end of the pivotal write protect piece has laterally extending cylindrical arms, and the mounting means for the pivotal write protect piece comprises spaced-apart facing supports on the inner surface of the other of the top and bottom panels within which the arms are journaled.

4. A write protect device according to claim 3 wherein the write protect piece has a head at the opposite end thereof substantially equal in thickness to the thickness of the record disk assembly, the head further having opposite head portions extending into the sensing opening and portion of the aperture in the first position of the write protect piece.

5. A write protect device according to claim 4 wherein one of the cylindrical arms has an eccentric cam which is interposed between the top and bottom panels.

6. A write protect device according to claim 5 wherein the arm has an axis, and the cam and the head of the write protect piece lie in the same plane passing through the axis.

7. A write protect device according to claim 6 wherein one of the top and bottom panels is deflected by the cam upon movement of the pivotal write protect piece between its first and second positions whereby the one panel exerts a resilient force on the cam for releasably holding the pivotal write protect piece in a selected one of the first and second positions.

* * * * *